May 6, 1941.  R. H. TALBOT  2,241,225
CURING OF SYNTHETIC RESIN FILMS
Filed Dec. 9, 1939
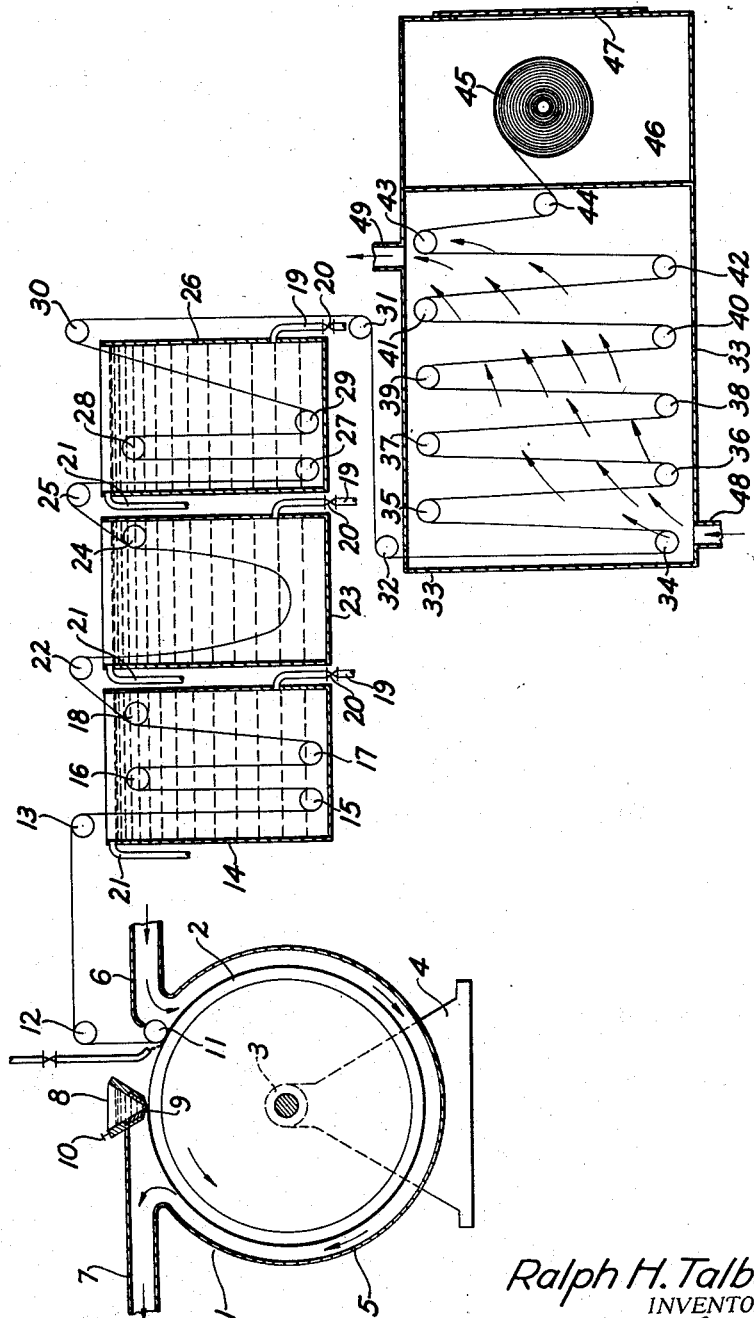
Ralph H. Talbot
INVENTOR
BY Daniel J. Mayne
ATTORNEYS Patented May 6, 1941

2,241,225

UNITED STATES PATENT OFFICE 2,241,225

CURING OF SYNTHETIC RESIN FILMS

Ralph H. Talbot, Rochester, N. Y., assignor to Eastman Kodak Company, Rochester, N. Y., a corporation of New Jersey Application December 9, 1939, Serial No. 308,501

2 Claims. (Cl. 18—57)

This invention relates to the production of film, sheeting and other attenuated products from vinyl and other synthetic resins, and more particularly to a method of curing and otherwise treating said films after removal from the surface upon which they have been formed to give the films physical properties which adapt them for use as photographic film base and for other purposes.

In recent years, research carried on in connection with the production and use of vinyl resins has demonstrated that certain of these materials, particularly the acetals derived by condensing various aldehydes with polyvinyl alcohols or partially hydrolyzed polyvinyl esters may be employed satisfactorily in the manufacture of photographic film base, sheeting and other attenuated products. In general, it may be said that such resins are susceptible of being cast or extruded by a procedure analogous to that employed in the manufacture of film and sheeting from cellulose derivatives. However, due to their peculiar physical and chemical characteristics, particularly their inherent tendency to adhere to surfaces upon which they are cast from solution and their tendency to stretch when subjected to relatively slight tension at moderately elevated temperatures, many unusual and difficult problems are encountered when one attempts to apply known film-forming technique as practiced in the cellulose derivative industry to these resinous materials.

One of the most serious problems in the manufacture of resin films and sheeting is encountered in the handling of the material after removal from the surface upon which it is cast from solution. As is well known, a certain amount of tension, however slight, is necessary to pull the film from the casting surface and subsequently to convey it to the various solvent extracting steps required to bring it into a condition fit for use as photographic film base and for similar purposes. One peculiarity of such resin films is their extreme tendency to stretch under the influence of heat and even a relatively low degree of tension. This tendency to stretch is aggravated when the film contains residual solvent. Experience has shown that when even a comparatively insignificant amount of solvent remains in the film after casting, it acts to plasticize the resin material to such a degree that it will stretch under the influence of even very light tension. This stretching of the film results in micellar orientation and an internally strained condition of the film structure. So pronounced is this tendency to stretch in vinyl resin films that it may be in extreme cases, one hundred fold greater than in ordinary cellulose ester films.

As is well recognized in the art of film base manufacture, it is of vital importance that a finished film have as low a tendency toward shrinkage as possible to the end that any photographic image which may be carried by the material may not be subject to distortion. This is particularly important in the manufacture of film support for use in aerial photography, map work, photo-mechanical processes and similar purposes. In such films when processed and used under different conditions of age or relative humidity, shrinkage of the base or support takes place unevenly and the photographic image is seriously distorted.

It has been found that certain synthetic resin films, particularly those prepared by hydrolyzed vinyl acetates, the hydroxyls of which have been condensed with formaldehyde, are extremely difficult to handle after stripping. The problem of properly curing and hardening these materials is aggravated by the fact that it is necessary to apply a certain amount of heat to drive off the solvents, notwithstanding the pronounced tendency of the film to stretch and this gives rise to the above-mentioned internal, strained condition of the film structure. It will thus be seen that the proper curing and handling of these materials involves a series of extremely delicate operations, totally or substantially at variance with ordinary film-casting technique.

This invention has as an object to provide a method of satisfactorily removing residual solvent from vinyl and other synthetic resin films subsequent to their removal from surfaces upon which they have been cast from solution. A further object is to provide a curing method for such materials in which the film after curing will have a minimum tendency towards shrinkage. A still further object is to provide a method of treating vinyl and similar resin films which may have been stretched during or after removal from the surface upon which they are cast so as to relieve internal strains and thereby to provide a substantially non-shrinking type of product. Other objects will appear hereinafter.

These objects are accomplished by the following invention which, in its broader aspects, comprises subjecting a vinyl or other synthetic resin film which has been stretched in a plastic condition and subsequently solidified while still stretched, to a hot water treatment to relieve the longitudinal or other internal strains and to permit the material to shrink back to its original length and width, that is, the dimensions it had before removal from the film-forming surface. In practice, the film will generally be carried through a series of steps as follows: The film, while still soft and stretchy due to the unavoidable presence of a certain amount of residual solvent, is subjected to a cooling treatment which sufficiently hardens the resin to permit it to be handled satisfactorily in the subsequent steps. It is then subjected in the absence of tension to a hot water treatment to remove internal strains which may have been set up by unavoidable elongation or stretching of the film under the influence of the tension required to strip it and move it along through the various treating steps and thus permit the film to relax and return to its original dimensions. Finally, the material is given what may be called an ironing treatment to remove wrinkles or other distortion incident to relaxing the film in the hot water.

In the following examples and description, I have set forth several of the preferred embodiments of my invention, but they are included merely for purposes of illustration and not as a limitation thereof.

In accordance with one form of my invention the film material after removal from the film-forming surface under as low tension as possible, is conveyed into a bath of cool water which serves, not only to extract some of the residual solvent, but also primarily so to solidify the resin material as to permit it to be carried along through the process without undue stretching. The film in this relatively hardened condition is next passed into what may be designated as an annealing bath of warm water heated to or slightly above the softening point of the resin. In this bath, as previously indicated, the film is simply festooned so as to permit full longitudinal shrinkage and consequent release of internal strains.

It is a notable characteristic of vinyl resin films, particularly those specifically identified above, that they have what may be called an elastic memory, that is, the ability to shrink longitudinally and at the same time regain their original width, that is, the width they had on the film-forming surface at the point of stripping. This may take place over long periods of time and unless removed, results in an imperfect and unreliable product. The purpose of the annealing bath is then to permit this elastic return to the film's original dimensions.

After completely relaxing and regaining its original dimensions, the film is then conveyed, under minimum possible tension, into a final cooling bath which serves again to solidify or harden the material to such a degree as to permit it to be handled without stretching in the subsequent treatment. The final step of my process consists in subjecting the film to the above-mentioned warm air ironing treatment which also serves to remove the least traces of solvent and to evaporate any surface water which the film may have picked up in passing through the last water bath.

My invention is further illustrated by the single figure of the accompanying drawing which is a diagrammatic, elevational, sectional view of one type of apparatus by which the various steps of the process may be carried out.

Referring to the drawing, the numeral 1 designates a conventional type of film-forming apparatus comprising the casting or coating wheel 2 mounted in suitable bearings 3. The wheel assembly is mounted on base 4 and surrounded by wheel casing 5 which is provided with air inlet conduit 6 and outlet conduit 7. Numeral 8 designates a conventional type of dope hopper provided with adjustable gate member 9 for regulating the thickness of the dope stream which flows therefrom, adjustment being by means of thumb screw 10 attached in known manner to the gate member and threaded through one wall of the hopper.

Inlet conduit 6 may be provided with an air heater and air filter (not shown) if desired. Circulation of heated air through the wheel casing is illustrated by the arrows, air entering through conduit 6, passing countercurrently to the direction of rotation of the wheel and finally leaving the apparatus through the conduit 7. The solvent laden air passing out through conduit 7 may, if desired, be conveyed to a suitable solvent recovery system (not shown).

As the wheel 2 rotates slowly in the direction indicated by the arrow thereon, a solution or dope composed of a vinyl or other synthetic resin dissolved in a volatile solvent or solvent combination is fed from the hopper 8 to the surface of the wheel. The thickness of the dope stream is regulated by adjustment of the gate member 9 to give a film of appropriate eventual thickness, say of the order of .005 inch.

The film is removed from the film-forming surface as illustrated, a stripping roll 11 so mounted in bearings (not shown) as to be in close proximity to the surface of the wheel 2. The film passes from stripping roll 11 over guide rolls 12 and 13 and thence into tank 14.

Tank 14 is provided with a series of driven rolls 15, 16, 17, and 18 mounted in suitable bearings within the tank in such a manner as to provide a maximum travel of the film therein. The tank is also provided with an inlet conduit 19 controlled by valve 20 for supplying the tank with cool water. The numeral 21 designates an over-flow pipe of such dimensions and so positioned that it conveys away the excess liquid from the tank. Flow of water through the tank may also be controlled by means of an appropriate constant level device located in the body of the water and cooperating in known manner with valve 20.

Numeral 22 designates a guide roll over which the hardened film passes into tank 23 which is provided with means similar to tank 21 for maintaining a constant level of warm water therein. Roll 24 may be either a guide roll or a driven roll. The film in passing through tank 23 is simply festooned into the tank over rolls 22 and 24, thence passing over guide roll 25 into tank 26 which also is provided with appropriate means for maintaining a constant level of cool water therein. Rolls 27, 28, and 29 are driven rolls which operate similarly to the rolls of tank 14.

Numerals 30, 31 and 32 designate further guide rolls over which the film after emerging from tank 26 passes on its way to air chamber 33. This chamber is provided with a series of rolls 34, 35, etc., over which the film is conveyed, finally passing over guide roll 44 to wind-up roll 45 which may, if desired, be located in a separate compartment 46, access to which is given through hinged door 47. Numeral 48 designates an air inlet through which heated air is conveyed into and through the chamber 33 in the direction indicated by the arrows finally passing out of the chamber by means of conduit 49.

The following examples will serve further to illustrate my invention.

Example 1

A polyvinyl formaldehyde acetal resin formed by condensing formaldehyde with partially hydrolyzed polyvinyl acetate according to the method described in U. S. Patent 2,036,092, Reissue 20,430, was dissolved in a solvent mixture consisting of 80% ethylene chloride and 20% methyl alcohol. The ratio of solvent to resin was 5-1. The filtered and deaerated solution of the resin which was maintained at a temperature of approximately 100° F. was flowed onto the polished surface of a conventional type of coating wheel as described above. The wheel was rotated at a speed which would allow the coated resin support to be in contact with the wheel surface for about 30-40 minutes.

Curing on the wheel was accomplished by circulating air through the wheel casing in a direction countercurrent to the movement of the wheel, the temperature of the circulating air being about 102° F. The film adhered tenaciously to the wheel at the stripping roll, and even though precautions were used at this point the film stretched upon stripping to an extent of approximately 20%.

The stretched film material was then conveyed into a series of three baths containing, respectively, cool water, warm water and cool water. The water in the first bath was maintained at about 83° F. This bath was provided with driven rolls, the purpose of which was to strip the film from the coating surface. The film stretched very little, if any, in this bath, but some solvent removal was accomplished as could be shown by the increased stiffness of the material as it left this first bath.

The film was next allowed to festoon into the second bath, the temperature of which was maintained at about 125° F. In this bath the material decreased in length and increased in width until it was the same width as the film on the wheel at the point of stripping. In other words, the strains put in the material due to the tension necessary to strip it from the wheel were all relieved in this second bath. This was accomplished by causing or allowing the film to pass through the bath while under little or no tension and at a temperature just high enough to soften the material. This allows the complete relieving of internal strains which otherwise would remain in the final cured resin film.

The film was then drawn into the third waterbath by means of driven rollers. The temperature of this bath was maintained at about 100° F., at which temperature this particular resin was reasonably firm and did not undergo further stretching. After the material had been subjected to these three waterbath treatments it was sufficiently cured so that it could be cured further in a typical curing chamber such as that illustrated in the drawing. The temperature of the air circulating through the curing chamber was about 130° F. After passage through the chamber the film was found to have the proper shrinkage characteristics.

It has been found that this type of film, if coated and cured in the usual manner, i. e., without resorting to the waterbath treatment described above, will be in an extremely strained condition. A film cured in the normal manner has been found to have stretched during the curing process until its width is approximately only one-half the coating width. In other words, it has been stretched longitudinally to an extent of approximately 100%. The fact, as explained above, that these vinyl resins possess a so-called "elastic memory" causes such a film to be entirely unsuitable for use. For instance, material which has been thus strained will upon being warmed to a point near its softening temperature, which in the case of vinyl resins is quite low, exhibit a strong tendency to regain its unstretched state, that is, it will decrease in length and increase in width. On the other hand, vinyl resin film cured according to the preferred process described above will not exhibit this tendency to change dimensions upon warming, since the final cured support is in an entirely unstretched state and free from residual internal strains.

Example 2

A resin similar to that described above and made up in the same combination of solvents, but in a solvent-to-resin ratio of 3.8:1, was coated in the same manner as described above, except that the temperatures of the waterbaths were as follows: first bath 87° F., second bath 106° F., and third bath 78° F.

The film behaved in a manner similar to that described above, i. e., it stretched considerably between the wheel and the first waterbath, all of the strains were relieved in the second waterbath, and the final curing accomplished in the third waterbath and warm air section without stretching the resin support.

In the above examples, it should be noted that the speed of the second set of rolls which draw the film through the process, namely, the rolls of the third bath should operate at a slower linear speed than the first rolls to allow for contraction of the film by shrinkage in the second bath. The relative speeds of the rolls of the first and second baths will of course be adjusted in accordance with the shrinkage characteristics of the particular film material dealt with and the particular conditions under which the process is operated.

It will of course be evident that many changes may be made in the conditions of operation of my process within the scope of my invention. For example, the third bath may be composed of ethyl or methyl alcohol or other non-solvent material than water, depending upon the particular type of vinyl or other synthetic resin dealt with. In general, it may be said that the treating baths should consist of liquids which are non-solvent with respect to the film material and of such a nature that they do not adversely affect the film in any respect.

If the treatment in the first waterbath is sufficiently drastic as to remove or extract practically all of the solvent in the film, the third bath may, in some instances, be dispensed with. However, it will in general be necessary to carry the film material over a series of warm rolls as illustrated, in order to restore flatness to the product. The temperature of the rolls and/or of the air section in which they are contained should, in all cases, not be sufficiently high to render the film material plastic, but should be sufficient to soften it very slightly and permit it to be ironed flat.

One feature of my process should be particularly emphasized and that is the fact that the film in the second water-bath is suspended in a loose condition substantially free from any tension whatsoever. In this condition it is simply permitted to shrink under the influence of heat and return to its original length and width. In other words, by being thus freely suspended its "elastic memory" is permitted to exert itself and bring the film back to its original dimensions at the time it was stripped from the casting surface.

It will thus be seen that I have provided a means for solving some of the delicate and troublesome problems in the manufacture of film, sheeting and similar products from vinyl and other synthetic resinous materials characterized by an aggravated tendency to stretch under the influence of heat or because of the presence therein of even small amounts of residual solvent. In other words, I have provided a process whereby a vinyl or similar synthetic resin film may be cured without undue stretching.

The specific effect and the unexpected results obtained by permitting a film to relax in warm water in accordance with my invention can be further demonstrated by subjecting the film to a water bath shrinkage test. This test is carried out as follows:

*Waterbath shrinkage test*

All film undergoing this test, whether bearing an emulsion or not, is conditioned and measured both before and after processing in a constant humidity room at a relative humidity of 50% or as close thereto as is possible, and at a dry bulb thermometer reading of 70° F. For film support of Cine-Positive thickness (.0055 inch) or less, the time of conditioning before processing should be not less than 1¼ hours; after processing not less than 2¼ hours. Film support of greater than Cine-Positive thickness should be conditioned at least 2¼ hours before processing and 3-5 hours after processing. An emulsion coated support should be conditioned for at least 2½ hours both before and after processing.

To carry out the test, strips 15 inches long and 1½ inches wide are cut from the support. Usually two strips from each sample lengthwise of the support and two strips widthwise are used for the test and two sets of perforations are made in each strip. These strips are perforated on a punch and die perforating machine, the holes being approximately 10 inches apart. Measurements from outside edge to outside edge of the perforation holes are taken. Thus a reading, if immediately taken, should be zero on the gauge. The gauge employed is graduated in thousandths of an inch and since the perforations are 10 inches apart the percentage of dimensional change may be read directly from the gauge by merely moving the decimal point one place to the right.

The strips are conditioned at 50% relative humidity and then measured. They are then tacked loosely on a wooden rack and placed in a constant temperature thermostatically controlled water bath at 100° F. and left for 17 hours. The samples are then wiped to remove excess moisture and reconditioned at 50% relative humidity and then measured again and the dimensional change computed. As indicated above, this test measures the irreversible shrinkage, if any, due to loss of solvent from the support and also that due to the release of mechanical strains.

The waterbath shrinkage is a measure of two things: First, it is a measure of the residual solvent remaining in the film, that is, as the solvent is leached out by submersion in warm water, there will be a corresponding shrinkage of the film. This shrinkage, however, will take place uniformly in both directions. Secondly, the waterbath treatment for the removal of solvent will likewise slowly relieve the strains in the film. The shrinkages, due to the relieving of these strains, may greatly exceed the shrinkage due to the removal of solvent. Moreover, they will rarely be the same in the two directions. If the film has been stretched or strained in the lengthwise direction, the waterbath treatment will release this strain causing a high longitudinal shrinkage and a horizontal swelling. Thus it may be seen that a longitudinally stretched film, especially a resin film whose strains are easily removed even in water heated to a moderately elevated temperature, for example, 100° F., will exhibit a high lengthwise shrinkage and a low widthwise shrinkage.

With the above explanation the figures given below for waterbath shrinkage length and width of a resin film and for a cellulose derivative film, both being produced by customary methods (and without the water bath treatment of the present invention) clearly show that the resin film has been stretched to a pronounced degree.

*Waterbath shrinkage at 100°*

| | Resin film | Cellulose derivative film check |
|---|---|---|
| Length | .85 | .61 |
| Width | .13 | .58 |

In order to completely remove these strains according to my invention, the resin film was looped into a waterbath which was maintained at approximately 160° F., a temperature which caused the resin film to soften appreciably and shrink in length and swell in width. The size of the water bath and speed of treatment were such that any one portion of the resin support remained in the bath about one minute to one and one-half minutes. It should be especially noted that there was no tension whatsoever on the loop of resin film while it was in this softened condition. The resin film became firm again immediately upon leaving the water bath and coming in contact with the room air. In order to flatten the film from the wrinkles caused by the soft, pliable, resin support hardening quickly as it came in contact with the room air, the support was passed over a series of rolls such as shown in the drawing and heated only very moderately, i. e., about 110° F. at which temperature the wrinkles were slowly ironed out without stretching the support. This temperature, as indicated above, is quite critical and will vary from resin to resin depending upon its thermoplasticity, amount of residual solvent, etc. It is extremely important that this temperature be well below the softening point of the resin film, otherwise strains will be reintroduced.

After the waterboxing treatment, the film was again submitted to the water bath shrinkage test which, as explained above, will indicate the presence of strains by the difference between the lengthwise and widthwise shrinkage measurements. The measurements obtained on the two above-mentioned films are given below:

*Waterbath shrinkage at 100° F.*

|  | Resin | Cellulose derivative check |
|---|---|---|
|  | *Percent* | *Percent* |
| Length | .19 | .45 |
| Width | .19 | .44 |

These figures clearly show that all of the internal strains which may have been developed in the film due to unavoidable stretching have been removed and the film has become substantially non-shrinking.

What I claim is:

1. The method of making resin film which comprises depositing in the form of a film on a film-forming surface a solution of a resin in a volatile solvent, removing sufficient solvent by heating to permit the film to be stripped from the surface and thereafter simultaneously curing the film and relieving internal strains which may have been set up therein as a result of stripping by immersing the film in a hardening bath of cold water, then immersing the film while freely supported in a bath of warm water, then immersing the film in a second hardening bath of cold water, and finally ironing out any irregularities which may have developed in the film during the warm water treatment.

2. The method of making resin film which comprises depositing in the form of a film on a film-forming surface a solution of a resin in a volatile solvent, removing sufficient solvent by heating to permit the film to be stripped from the surface and thereafter simultaneously curing the film and relieving internal strains which may have been set up therein as a result of stripping by immersing the film in a bath of cold water for a sufficient length of time to harden the film to a degree which will permit its being drawn through the process without substantial stretching, removing the hardened film from the cold water and immersing it, while freely supported, in a bath of warm water, whereby the film is relaxed and permitted or caused to return to the original dimensions it had before stretching, removing the relaxed film from the warm water and immersing the film in a second bath of cold water, and finally ironing out any irregularities which may have developed in the film during the warm water treatment.

RALPH H. TALBOT.